United States Patent
Stimm et al.

(10) Patent No.: US 12,531,961 B2
(45) Date of Patent: *Jan. 20, 2026

(54) SYSTEMS AND METHODS FOR DETERMINING VIEWING PATHS THROUGH VIDEOS

(71) Applicant: GoPro, Inc., San Mateo, CA (US)

(72) Inventors: Daryl Stimm, Encinitas, CA (US); Kyler William Schwartz, Oceanside, CA (US); William Edward MacDonald, Oceanside, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/884,979

(22) Filed: Sep. 13, 2024

(65) Prior Publication Data

US 2025/0008050 A1    Jan. 2, 2025

Related U.S. Application Data

(63) Continuation of application No. 18/325,694, filed on May 30, 2023, now Pat. No. 12,101,574, which is a continuation of application No. 17/965,452, filed on Oct. 13, 2022, now Pat. No. 11,683,440, which is a continuation of application No. 17/239,641, filed on Apr. 25, 2021, now Pat. No. 11,477,394, which is a continuation of application No. 17/006,564, filed on Aug. 28, 2020, now Pat. No. 10,992,880.

(60) Provisional application No. 62/894,644, filed on Aug. 30, 2019.

(51) Int. Cl.
  *H04N 5/262*  (2006.01)
  *H04N 13/117*  (2018.01)
  *H04N 23/698*  (2023.01)

(52) U.S. Cl.
  CPC ......... *H04N 5/2628* (2013.01); *H04N 13/117* (2018.05); *H04N 23/698* (2023.01)

(58) Field of Classification Search
  None
  See application file for complete search history.

(56) References Cited

U.S. PATENT DOCUMENTS

| | | | |
|---|---|---|---|
| 9,703,446 B2 | 7/2017 | Somlai-Fisher | |
| 9,723,976 B2 | 8/2017 | Tesar | |
| 10,992,880 B1* | 4/2021 | Stimm | H04N 5/2628 |
| 11,477,394 B2* | 10/2022 | Stimm | H04N 5/2628 |
| 11,683,440 B2* | 6/2023 | Stimm | H04N 23/698 |
| | | | 348/39 |
| 12,101,574 B2* | 9/2024 | Stimm | H04N 5/2628 |
| 2015/0037003 A1 | 2/2015 | Fastige | |
| 2018/0241986 A1* | 8/2018 | Zhong | G06T 3/147 |
| 2019/0313119 A1* | 10/2019 | Han | H04N 19/174 |
| 2021/0243418 A1* | 8/2021 | Ojala | H04N 13/366 |
| 2021/0250523 A1 | 8/2021 | Stimm | |

(Continued)

*Primary Examiner* — Eileen M Adams
(74) *Attorney, Agent, or Firm* — Esplin & Associates, PC

(57) ABSTRACT

Multiple framings of a video may define different positionings of a viewing window at different moments within the video. The positionings of the viewing window defined by the multiple framings may be used as fixed positionings of the viewing window in a viewing path. The viewing path may define changes in the positioning of the viewing window between the fixed positionings. A presentation of the video may be generated to include the extents of the video within the viewing window.

20 Claims, 9 Drawing Sheets

(56) References Cited

U.S. PATENT DOCUMENTS

2023/0034490 A1 2/2023 Stimm
2023/0308601 A1 9/2023 Stimm

\* cited by examiner

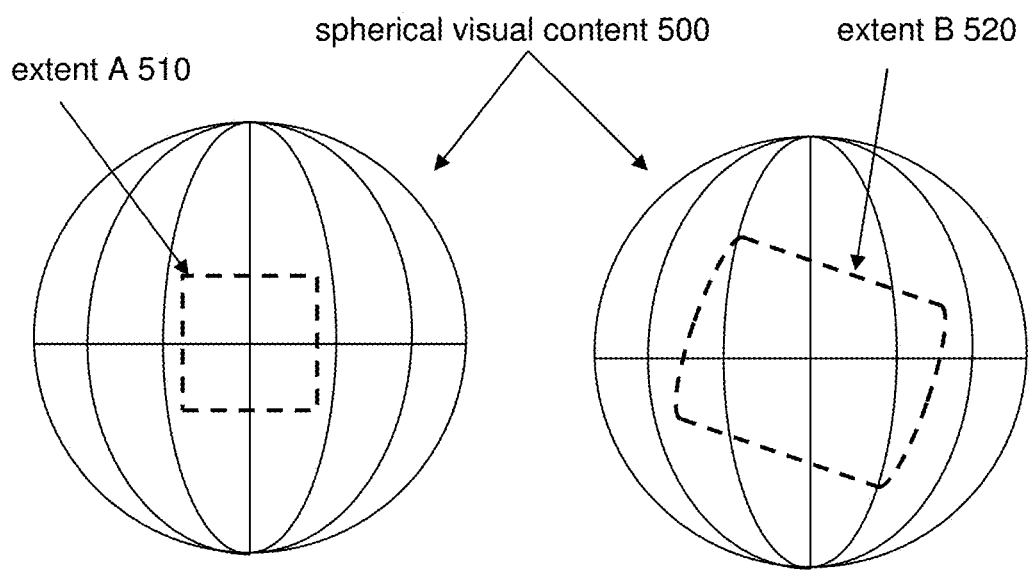
FIG. 5A  FIG. 5B

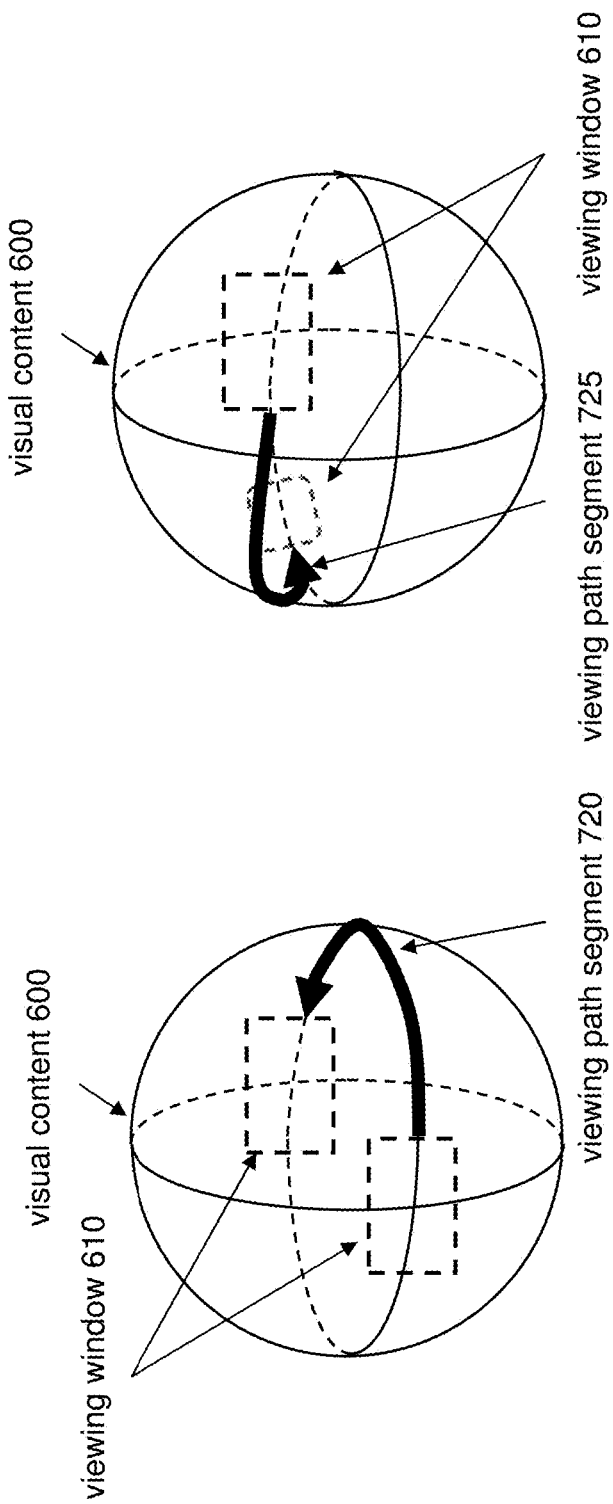

SYSTEMS AND METHODS FOR DETERMINING VIEWING PATHS THROUGH VIDEOS

FIELD

This disclosure relates to determining viewing paths through videos based on multiple framings of visual content of the videos.

BACKGROUND

A wide field of view video (e.g., spherical video, panoramic video) may include more visual content than may be viewed at once. Manually changing punchout of the video to display different spatial portions of the video may be difficult and time consuming.

SUMMARY

This disclosure relates to determining viewing paths through videos. Video information, framing information, and/or other information may be obtained. The video information may define a video. The video may include video content having a progress length. The video content may include visual content viewable as a function of progress through the progress length. The visual content may have a field of view. Framing information for the video may define multiple framings of the visual content at multiple moments within the progress length. An individual framing of the visual content may define a positioning of a viewing window within the field of view of the visual content at a corresponding moment within the progress length. The viewing window may define extents of the visual content to be included within a presentation of the video content. The multiple framings of the visual content may include a first framing of the visual content at a first moment within the progress length, a second framing of the visual content at a second moment within the progress length, and/or other framing of the visual content at other moments within the progress length. The second framing of the visual content may be different from the first framing of the visual content.

A viewing path for the video may be determined based on the framing information and/or other information. The viewing path may define the positioning of the viewing window within the field of view of the visual content as the function of progress through the progress length. The positioning of the viewing window may include a first positioning of the viewing window at the first moment, a second positioning of the viewing window at the second moment, and/or other positioning of the viewing window at other moments. The first positioning of the viewing window at the first moment may be determined based on the first framing of the visual content and/or other information. The second positioning of the viewing window at the second moment may be determined based on the second framing of the visual content and/or other information. The presentation of the video content may be determined based on the viewing path and/or other information. The presentation of the video content may include the extents of the visual content within the viewing window.

A system that determines viewing paths through videos may include one or more electronic storage, processor and/or other components. The electronic storage may store video information defining video, information relating to video, information relating to visual content of video, framing information for video, information relating to framings of visual content, information relating to viewing window, information relating to viewing path, information relating to presentation of video content, and/or other information.

The processor(s) may be configured by machine-readable instructions. Executing the machine-readable instructions may cause the processor(s) to facilitate determining viewing paths through videos. The machine-readable instructions may include one or more computer program components. The computer program components may include one or more of a video information component, a framing information component, a viewing path component, a presentation component, and/or other computer program components.

The video information component may be configured to obtain video information and/or other information. Video information may define a video. The video may include video content having a progress length. The video content may include visual content viewable as a function of progress through the progress length. The visual content may have a field of view. In some implementations, the video may include a spherical video and the field of view may include a spherical field of view. The visual content of the spherical video may be viewable from a point of view as the function of progress through the progress length.

The framing information component may be configured to obtain framing information for the video and/or other information. The framing information for the video may define multiple framings of the visual content of the video at multiple moments within the progress length. An individual framing of the visual content may define a positioning of a viewing window within the field of view of the visual content at a corresponding moment within the progress length. The viewing window may define extents of the visual content to be included within a presentation of the video content. The multiple framings of the visual content may include a first framing of the visual content at a first moment within the progress length, a second framing of the visual content at a second moment within the progress length, and/or other framing of the visual content. The second framing of the visual content may be different from the first framing of the visual content.

In some implementations, the individual framing of the visual content may define the positioning of the viewing window within the field of view of the visual content based on a viewing direction, a viewing size, a viewing rotation, and/or other information. In some implementations, the individual framing of the visual content may further define a viewing projection of the visual content within the viewing window.

In some implementations, at least one of the multiple framings may include a moment-to-duration framing. The moment-to-duration framing may extend a moment within the progress length to a duration longer than the moment within the presentation of the video content. The moment-to-duration framing may include multiple sub-framings within the duration.

In some implementations, the framing information may be obtained based on a user's interaction with a user interface and/or other information. The user interface may enable the user to set one or more of the viewing direction, the viewing size, the viewing rotation, the viewing projection, and/or other information.

The viewing path component may be configured to determine one or more viewing paths for the video based on the framing information and/or other information. A viewing path may define the positioning of the viewing window within the field of view of the visual content as the function of progress through the progress length. The positioning of the viewing window may include a first positioning of the viewing window at the first moment based on the first framing of the visual content, a second positioning of the viewing window at the second moment based on the second framing of the visual content, and/or other positioning of the viewing window.

In some implementations, determination of a viewing path for the video based on the framing information may include determination of changes in the positioning of the viewing window within the field of view of the visual content based on the multiple framings of the visual content at multiple moments within the progress length and/or other information. In some implementations, the viewing path may include viewing path segments for individual pairs of adjacent framings. The viewing path may include a first viewing path segment for a pair of the first framing and the second framing, and/or other viewing paths segments. The first viewing path segment may define changes in the positioning of the viewing window within the field of view of the visual content from the first positioning at the first moment to the second positioning at the second moment.

In some implementations, the changes in the positioning of the viewing window within the field of view of the visual content from the first positioning at the first moment to the second positioning at the second moment may include changes in one or more of a viewing direction, a viewing size, a viewing rotation, and/or a viewing projection for the viewing window.

In some implementations, a rate of the changes in the positioning of the viewing window within the field of view of the visual content at the second moment may be determined based on the first framing of the visual content at the first moment, a third framing of the visual content at a third moment, and/or other information. The second moment may be between the first moment and the third moment.

The presentation component may be configured to generate the presentation of the video content based on the viewing path and/or other information. The presentation of the video content may include the extents of the visual content within the viewing window.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 5A-5B illustrate example extents of spherical visual content.

FIGS. 7A and 7B illustrate examples of viewing path segments.

DETAILED DESCRIPTION

Figure 1:
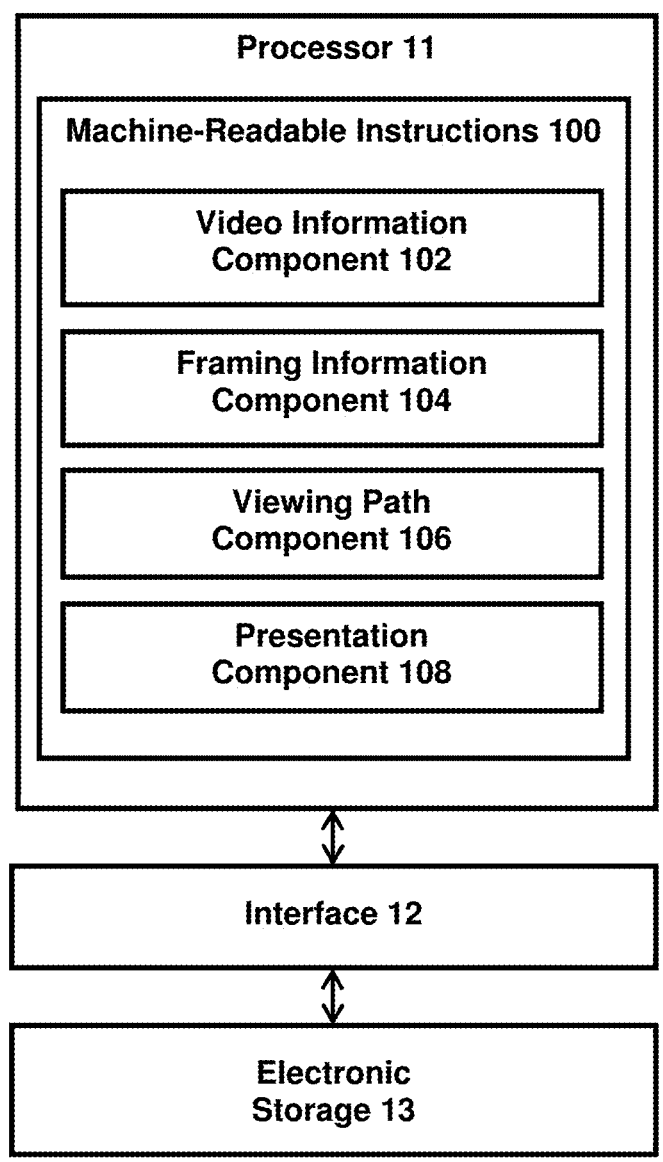
FIG. 1 illustrates a system that determines viewing paths through videos.

FIG. 1 illustrates a system 10 for determining viewing paths through videos. The system 10 may include one or more of a processor 11, an interface 12 (e.g., bus, wireless interface), an electronic storage 13, and/or other components. Video information, framing information, and/or other information may be obtained by the processor 11. The video information may define a video. The video may include video content having a progress length. The video content may include visual content viewable as a function of progress through the progress length. The visual content may have a field of view. Framing information for the video may define multiple framings of the visual content at multiple moments within the progress length. An individual framing of the visual content may define a positioning of a viewing window within the field of view of the visual content at a corresponding moment within the progress length. The viewing window may define extents of the visual content to be included within a presentation of the video content. The multiple framings of the visual content may include a first framing of the visual content at a first moment within the progress length, a second framing of the visual content at a second moment within the progress length, and/or other framing of the visual content at other moments within the progress length. The second framing of the visual content may be different from the first framing of the visual content.

A viewing path for the video may be determined by the processor 11 based on the framing information and/or other information. The viewing path may define the positioning of the viewing window within the field of view of the visual content as the function of progress through the progress length. The positioning of the viewing window may include a first positioning of the viewing window at the first moment, a second positioning of the viewing window at the second moment, and/or other positioning of the viewing window at other moments. The first positioning of the viewing window at the first moment may be determined based on the first framing of the visual content and/or other information. The second positioning of the viewing window at the second moment may be determined based on the second framing of the visual content and/or other information. The presentation of the video content may be generated by the processor 11 based on the viewing path and/or other information. The presentation of the video content may include the extents of the visual content within the viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining video, information relating to video, information relating to visual content of video, framing information for video, information relating to framings of visual content, information relating to viewing window, information relating to viewing path, information relating to presentation of video content, and/or other information.

A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of one or more images and/or one or more videos that may be consumed visually. For example, visual content may be included within one or more image and/or one or more video frames of a video. The video frame(s) may define the visual content of the video content. That is, video content may include video frame(s) that define the visual content of the video content. Video frame(s) may define visual content viewable as a function of progress through the progress length of the video content. A video frame may include an image of the video content at a moment within the progress length of the video content. A video frame may include one or more of I-frame, P-frame, B-frame, frame of pixels, and/or other video frames. Visual content may be generated based on light received within a field of view of a single image sensor or within fields of view of multiple image sensors during a capture period.

Visual content may have a field of view. A field of view of visual content may refer to an extent of a scene captured and/or viewable within the visual content. A field of view of visual content may refer to a part of a scene from which light is received for generation of the visual content. For example, the video may include a wide field of view video, such as a spherical video defining visual content viewable from a point of view as a function of progress through the progress length, and the field of view may of the spherical video may include a spherical field of view (360 degrees of capture). Other wide field of view are contemplated. A field of view of visual content may be static (unchanging) or dynamic (changing). For example, a field of view of visual content of video content may change as a function of progress through the progress length of the video content. Other fields of view are contemplated.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with at least a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. Other sizes and qualities of spherical video content (e.g., 5.6K, 8K+) are contemplated. In some implementations, spherical video content may be consumed as virtual reality content.

Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video content captured from a path taken by the image capture device(s) in the moving position. For example, spherical video content and/or virtual reality content may include video content captured by a spherical camera of a person walking around in a music festival.

Figure 3:
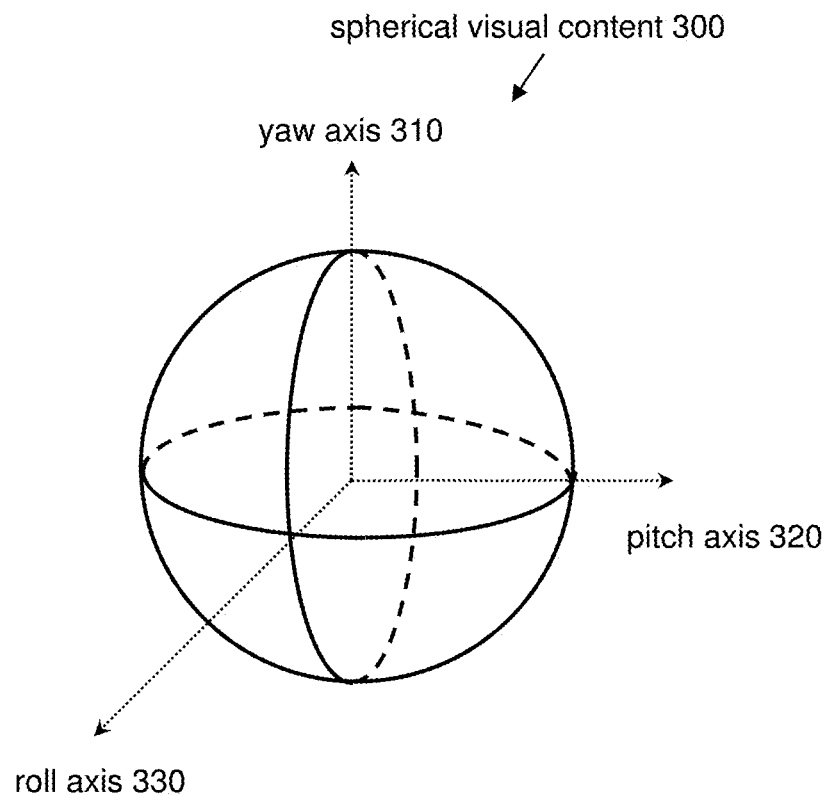
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
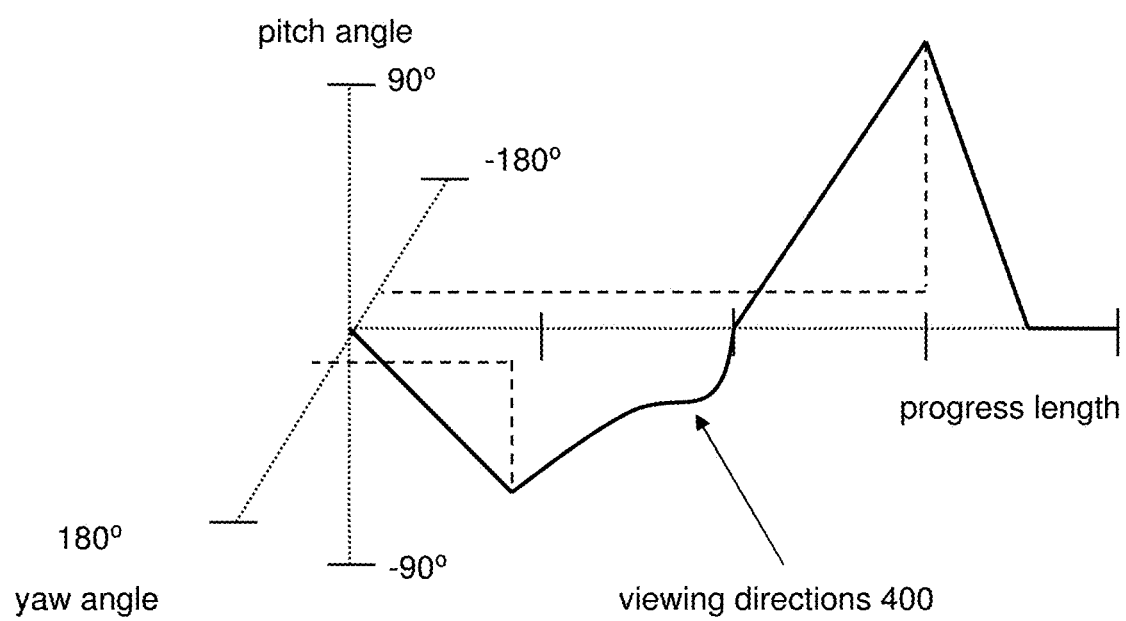
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of the viewing window. A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

FIGS. 5A-5B illustrate examples of extents for spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

In some implementations, the viewing window may be characterized by a viewing projection. A viewing projection may define how pixels within the viewing window is arranged for presentation on a display. A viewing projection may define how the pixels of an image are arranged to form the visual content. A viewing projection may refer to how portions of the visual content/pixels are mapped onto a two-dimensional plane (e.g., two-dimensional image). For example, a viewing projection may arrange pixels of the image such that one or more visual elements (defined by one or more pixels) of the visual content are stretched (e.g., at the top or bottom of an image arranged using an equirectangular projection) or not stretched (e.g., middle of an image arranged using a rectilinear projection). Example viewing projections may include rectilinear projection, cylindrical projection, Mercator projection, Miller projection, Lambert projection, equirectangular projection, stereographic projection, fisheye projection, equisolid projection, orthographic projection, cubic projection, sinusoidal projection, transverse projection (rotation of a projection by 90 degrees), Panini projection, architectural projection, and/or other viewing projections.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate determining viewing paths through videos. The machine-readable instructions 100 may include one or more computer program components. The machine-readable instructions 100 may include one or more of a video information component 102, a framing information component 104, a viewing path component 106, a presentation component 108, and/or other computer program components.

The video information component 102 may be configured to obtain video information defining one or more videos (e.g., non-spherical video, spherical video, panoramic video) and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining a video during acquisition of the video and/or after acquisition of the video by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information may be obtained based on a user's interaction with a user interface/application (e.g., video editing application, video player application), and/or other information. For example, a user interface/application may provide option(s) for a user to select one or more videos to be presented and/or for which viewing paths are to be determined. The video information defining the video(s) may be obtained based on the user's selection of the video(s) through the user interface/video application.

Video information may define one or more videos. The video information may define a video by including information that defines one or more content, qualities, attributes, features, and/or other aspects of the video. For example, the video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. For example, the video information may include information that makes up and/or is used to determine pixels of video frames of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The framing information component 104 may be configured to obtain framing information for the video and/or other information. Obtaining framing information may include one or more of accessing, acquiring, analyzing, determining, examining, identifying, loading, locating, opening, receiving, retrieving, reviewing, storing, and/or otherwise obtaining the framing information. The framing information component 104 may obtain framing information from one or more locations. For example, the framing information component 104 may obtain framing information from a storage location, such as the electronic storage 13, electronic storage of a device accessible via a network, and/or other locations. The framing information component 104 may obtain framing information from one or more hardware components (e.g., computing device, electronic storage) and/or one or more software components (e.g., software running on a computing device). Framing information may be stored within a single file or multiple files.

In some implementations, the framing information component 104 may obtain framing information based on a user's interaction with a user interface/application (e.g., video editing application, video player application), and/or other information. The user interface/application may provide option(s) for a user to set and/or define one or more framings of the visual content. For example, the user interface/application may enable the user to select individual moments within the progress length to specify a framing of the visual content, and enable the user to set one or more of the viewing direction, the viewing size, the viewing rotation, the viewing projection, and/or other information to define the individual framings of the visual content at the selected moments.

In some implementations, the framing information component 104 may obtain framing information based on the video information and/or the video information component 102 obtaining the video information. For example, the framing information may be associated with the video/video information obtained by the video information component 102, and the framing information component 104 may obtain the associated framing information based on obtaining of the video information. The framing information may be included within metadata of the obtained video, and the framing information may be obtained based on obtaining (e.g., selection, retrieval) of the video. The framing information may be included within the video information, and the framing information component 104 may obtain framing information by extracting the framing information from the video information.

In some implementations, the framing information component 104 may obtain framing information based on analysis of the video information and/or the video defined by the video information. For example, visual content detection (e.g., object detection, scene detection, activity detection) and/or audio content detection (e.g., sound detection, speech detection, command detection, cheering detection) may be performed and the framings of the visual content (e.g., number of framings; locations of the framings within the progress length; viewing directions, viewing sizes, viewing rotations, and/or viewing projections of framings) may be determined based on the results of the visual content detection (e.g., object, scene, and/or activity detected within the visual content) and/or the audio content detection (e.g., sound, speech, command, and/or cheering detected within the visual content). That is, content analysis of the video content may be used to automatically determine framings of the visual content.

The framing information for the video may define multiple framings of the visual content of the video at multiple moments within the progress length. Framings of the visual content of the video may include different framings of the visual content at different moments within the progress length. An individual framing of the visual content may define a positioning of a viewing window within the field of view of the visual content at a corresponding moment within the progress length. The viewing window may define extents of the visual content to be included within a presentation of the video content. A positioning of the viewing window within the field of view of the visual content may refer to placement of the viewing window within the field of view of the visual content. The positioning/placement of the viewing window may be defined by one or more of viewing direction, viewing size, viewing rotation, and/or other information. An individual framing of the visual content may define arrangement of pixels within the viewing window for presentation. The arrangement of the pixels within the viewing window may be defined by viewing projection and/or other information.

The multiple framings of the visual content may include different framings of the visual content at different moments within the progress length. A moment within the progress length may include a point (e.g., a point in time, a video frame) or a duration (e.g., a duration of time, a grouping of adjacent video frames) within the progress length. Individual framings of the visual content may define positionings of the viewing window within the field of view of the visual content based on the corresponding viewing direction, viewing size, viewing rotation, and/or other information. Individual framings of the visual content may further define corresponding viewing projections of the visual content within the viewing window.

Figure 6C:
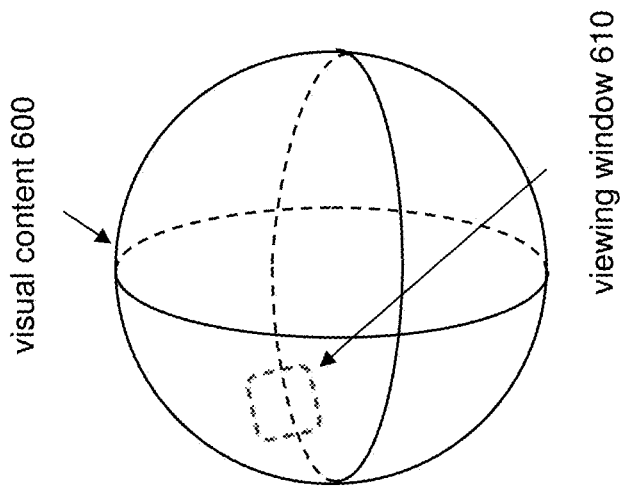
FIGS. 6A, 6B, 6C, and 6D illustrate example framings of visual content.
Figure 6B:
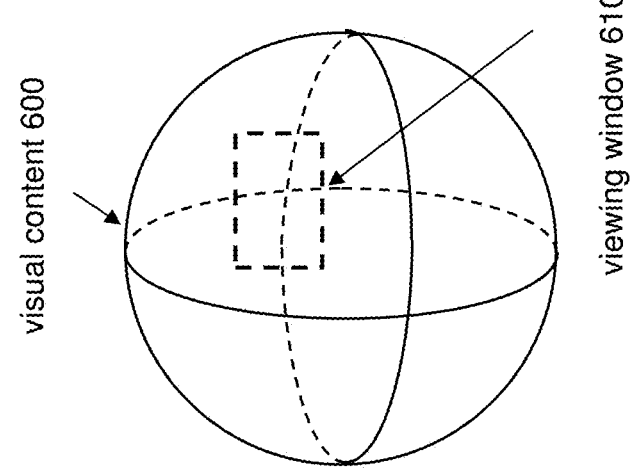
Figure 6A:
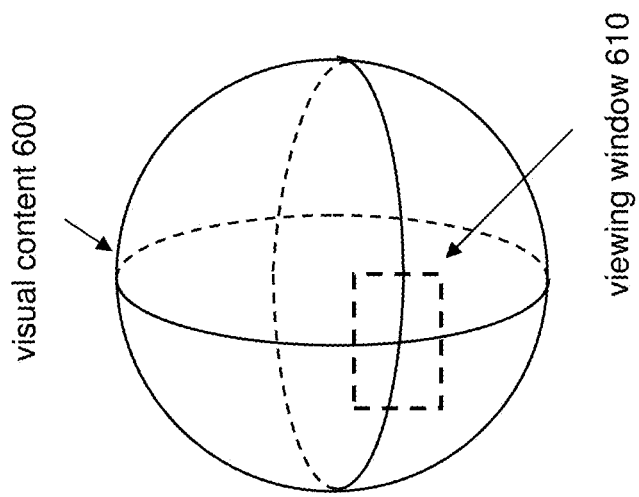

For example, FIGS. 6A, 6B, and 6C illustrate different framings of visual content 600 at different moments within the progress length of the visual content 600. For instance, the visual content 600 may include visual content of a video, and FIGS. 6A, 6B, and 6C may illustrate the visual content 600 within different video frames of the video (content of the video frames at different moments within the progress length). For example, as shown in FIG. 6A, a framing of the visual content 600 at a first moment within the progress length may include a viewing window 610 being positioned at the front of the visual content 600 and being leveled within the visual content 600. As shown in FIG. 6B, a framing of the visual content 600 at a second moment (subsequent to the first moment) within the progress length may include the viewing window 610 being positioned at the back of the visual content 600 and being leveled within the visual content 600. As shown in FIG. 6C, a framing of the visual content 600 at a third moment (subsequent to the second moment) within the progress length may include the viewing window 610 being positioned at front-upper-right of the visual content 600. The framing of the visual content 600 at the third moment may include the viewing window 610 being tilted and having a different dimension (e.g., different shape, smaller size) than the framing of the visual content at the first moment and the second moment. Other framings of the visual content are contemplated.

In some implementations, at least one of the multiple framings may include a moment-to-duration framing. A moment-to-duration framing may refer to a framing that changes the progress length of the video/visual content. For example, a moment-to-duration framing may extend a moment (e.g., point in time, duration of time) within the progress length to a duration longer than the moment within the progress length/presentation of the video content. For example, a moment-to-duration framing may include visual content at a point within the progress length that has been duplicated over a duration longer than the point. For instance, a video frame corresponding to the moment-to-duration framing may be duplicated into multiple video frames so that the same content within the video frame is presented during the duration corresponding to the moment-to-duration framing.

As another example, a moment-to-duration framing may include a video segment with the playback rate and/or playback direction defined by the moment-to-duration framing. For instance, video frames corresponding to the moment-to-duration framing may be played back at a playback rate different (e.g., faster, slower) than the normal playback rate (1× speed) and/or the order/direction in which the video frames are presented may be changed (e.g., forward playback direction, reverse playback direction).

A moment-to-duration framing may include multiple sub-framings within the duration of the moment-to-duration framing. A sub-framing may refer to a framing within the duration of the moment-to-duration framing. The multiple sub-framings within the duration may enable different portions of the visual content corresponding to the duration to be included within a presentation of the visual content. For example, for a moment-to-duration framing that extend a moment (e.g., point in time, duration of time) within the progress length to a duration longer than the moment within the progress length/presentation of the video content, multiple sub-framings may simulate the video being paused for the duration and different portions of the visual content being presented while the video is paused.

Figure 6D:
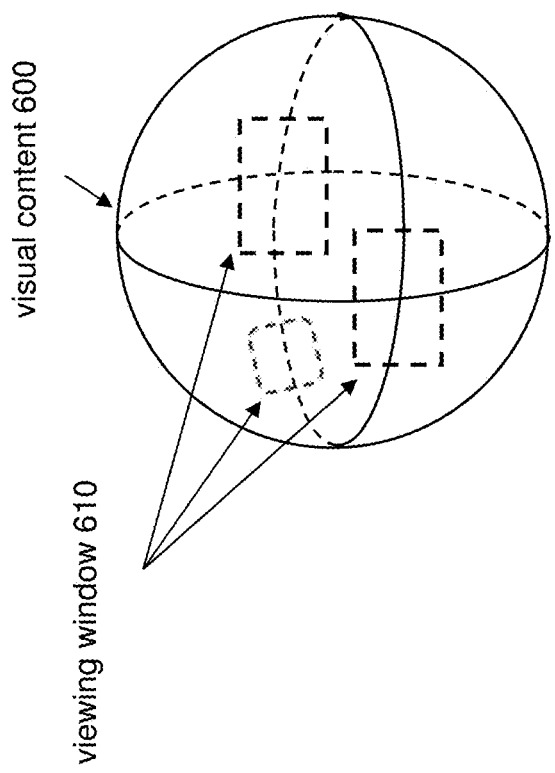

FIG. 6D illustrate an example moment-to-duration framing of visual content 600. The visual content 600 may correspond to visual content of a video at a moment (e.g., a point in time) within the progress length of the video. For example, the visual content 600 may be visual content of a video frame within the video. The moment-to-duration framing of the visual content 600 may extend the moment within the progress length to a duration longer than the moment within the progress length/presentation of the video content. The moment-to-duration framing of the visual content 600 may include the visual content 600 being duplicated over the duration (the video frame being duplicated to extend the duration) so that the presentation of the video appears to be paused during playback of the duration. The moment-to-duration framing of the visual content 600 may include multiple sub-framings within the duration. For example, as shown in FIG. 6, the moment-to-duration framing of the visual content 600 may include three sub-framings within the duration. For instance, the multiple sub-framings of the visual content 600 may include the viewing window 610 being positioned (1) at the front of the visual content 600 and being leveled within the visual content 600 at the beginning of the duration, (2) at the back of the visual content 600 and being leveled within the visual content 600 within the duration (e.g., at the midpoint, at non-midpoint), and (3) at front-upper-right of the visual content 600 and being tiled and having a different dimension at the end of the duration. Other sub-framings of the visual content are contemplated.

The viewing path component 106 may be configured to determine one or more viewing paths for the video based on the framing information and/or other information. A viewing path may refer to a path or a progression of the positioning of the viewing window within the field of view of the visual content as the function of progress through the progress length. A viewing path may define the positioning of the viewing window within the field of view of the visual content as the function of progress through the progress length. The positioning of the viewing window defined by the viewing path may include the positioning of the viewing window defined by the multiple framings of the visual content. Different framings of the visual content at different moments within the process length may dictate the positioning of the viewing window defined by the viewing path. Different framings of the visual content at different moments within the process length may define fixed positionings of the viewing window within the viewing path. The viewing path component 106 may determine the viewing path to include the fixed positionings of the viewing window within the viewing path. The viewing path component 106 may determine the viewing path to include changes in the positioning of the viewing window between the fixed positionings of the viewing window within the viewing path.

For example, the multiple framings of the visual content may include a first framing of the visual content at a first moment within the progress length and a second framing of the visual content at a second moment within the progress length, and the positioning of the viewing window defined by the viewing path may include a first positioning of the viewing window at the first moment based on the first framing of the visual content, a second positioning of the viewing window at the second moment based on the second framing of the visual content, and/or other positioning of the viewing window. Such determination of the viewing path may enable determination of a path through the visual content that takes into account the multiple framings of the visual content. For instance, the multiple framings may reflect a user's intended spatial and temporal positioning of the viewing window for a spherical video and the viewing path may define a path on the sphere that takes into account the user's designations (e.g., markers) that reflect which portions of the spherical video should be presented during playback.

In some implementations, determination of a viewing path for the video based on the framing information may include determination of changes in the positioning of the viewing window within the field of view of the visual content based on the multiple framings of the visual content at multiple moments within the progress length and/or other information. The viewing path component 106 may determine the viewing path by determine how the positioning of the viewing window should change between adjacent framings of the visual content (framings of the visual content that are next to each other in the progress length). The viewing path may include viewing path segments for individual pairs of adjacent framings, and the viewing path component 106 may determine a viewing path segment based on the corresponding pairs of adjacent framings.

For example, the viewing path component 106 may determine a viewing path segment for a pair of the first framing and the second framing, and/or other viewing paths segments. The viewing path segment may define changes in the positioning of the viewing window within the field of view of the visual content from the first positioning at the first moment to the second positioning at the second moment. In some implementations, the changes in the positioning of the viewing window within the field of view of the visual content from the first positioning at the first moment to the second positioning at the second moment may include changes in one or more of a viewing direction, a viewing size, a viewing rotation, and/or a viewing projection for the viewing window.

FIGS. 7A and 7B illustrate examples of viewing path segments 720, 725. The viewing paths 720, 725 may be determined based on the framings of the visual content 600 shown in FIGS. 6A, 6B, and 6C. The framings of the visual content 600 shown in FIGS. 6A, 6B, and 6C may define fixed positionings of the viewing window 610 for the visual content 600 at different moment within the progress length of the visual content 600. The viewing path for the visual content may be determined to include the viewing path segment 720, 725.

The adjacent framings shown in FIGS. 6A and 6B may be used to determine the viewing path segment 720. Adjacent framings of the visual content define fixed positionings of the viewing window within the viewing path at their corresponding moments (at the first moment and the second moment). The viewing path component 106 may determine the viewing path segment 720 to include the fixed positionings of the viewing window within the viewing path so that the viewing path segment 720 starts (at the first moment) with the viewing window 610 positioned at the front of the visual content 600 and being leveled within the visual content 600 and ends (at the second moment) with the viewing window 710 positioned at the back of the visual content 600 and being leveled within the visual content 600.

The viewing path component 106 may determine the viewing path segment 720 to include changes in the positioning of the viewing window between the fixed positionings of the viewing window within the viewing path segment 720 so that one or more of the viewing direction, the viewing size, the viewing rotation, and/or the viewing projection for the viewing window 610 changes from the being positioned at the front of the visual content 600 and being leveled within the visual content 600 to being positioned at the back of the visual content 600 and being leveled within the visual content 600. For instance, in FIG. 7A, the viewing path segment 720 may include changes in the viewing direction of the viewing window 610 from being pointed in the front of the sphere to the back of the sphere.

The adjacent framings shown in FIGS. 6B and 6C may be used to determine the viewing path segment 725. Adjacent framings of the visual content define fixed positionings of the viewing window within the viewing path at their corresponding moments (at the second moment and the third moment). The viewing path component 106 may determine the viewing path segment 725 to include the fixed positionings of the viewing window within the viewing path so that the viewing path segment 725 starts (at the second moment) with the viewing window 610 positioned at the back of the visual content 600 and being leveled within the visual content 600 and ends (at the third moment) with the viewing window 710 positioned at front-upper-right of the visual content 600, being tilted, and having a different dimension (e.g., different shape, smaller size) than the positioning of the visual content at the first moment and the second moment.

The viewing path component 106 may determine the viewing path segment 725 to include changes in the positioning of the viewing window between the fixed positionings of the viewing window within the viewing path segment 725 so that one or more of the viewing direction, the viewing size, the viewing rotation, and/or the viewing projection for the viewing window 610 changes from the being positioned at the back of the visual content 600 and being leveled within the visual content 600 and ends with the viewing window 710 positioned at front-upper-right of the visual content 600, being tilted, and having a different dimension. For instance, in FIG. 7B, the viewing path segment 725 may include changes in the viewing direction of the viewing window 610 from being pointed to the back of the sphere to the front-upper-right of the sphere. The viewing path segment 725 may include changes in the viewing size of the viewing window 610 from being rectangular in shape to be a smaller square in shape. The viewing path segment 725 may include changes in the viewing rotation of the viewing window 610 from being leveled to being tilted. In some implementations, viewing rotations of the fixed positioning of the viewing window may be ignored and the viewing window may be leveled (with respect to horizon) to provide a leveled view of the visual content. The viewing path segment 725 may include changes in the viewing projection of the viewing window 610 from one type of viewing projection to another type of viewing projection. Other changes in the positioning of the viewing window are contemplated.

One or more types of interpolations may be used to determine changes in the positioning of the viewing window between fixed positionings of the viewing window within the viewing path. For example, a linear interpolation may be used to determine changes in the positioning of the viewing window along the viewing path segment 720 so that the viewing direction changes linearly (the same amount of change in viewing direction for the same amount of the progress length) from being pointed to the front of the sphere to the back of the sphere. A non-linear interpolation may be used to determine changes in the positioning of the viewing window along the viewing path segment 725 so that the viewing direction changes non-linearly (different amount of change in viewing direction for the same amount of the progress length) from being pointed to the back of the sphere to the front-upper-right of the sphere. For instance, an S-type non-linear curve may be used for non-linear interpolation so there are (1) smaller changes in the viewing direction in the beginning and the end of the viewing path segment 725 and (2) larger changes in the viewing direction in the middle of the viewing path segment 725, or vice versa. Other types of non-linear interpolation for changes in the positioning of the viewing window are contemplated.

In some implementations, the viewing path may be changed based changes in the framing information, changes in the framing of the visual content, changes in the fixed positionings of the viewing window, and/or other information. For example, the viewing path may be changed based on addition of a new framing of the visual content, removal of an existing framing of the visual content, and/or modification (e.g., modification of viewing direction, viewing size, viewing rotation, and/or viewing projection) of an existing framing of the visual content.

Figures 8A, 8B:
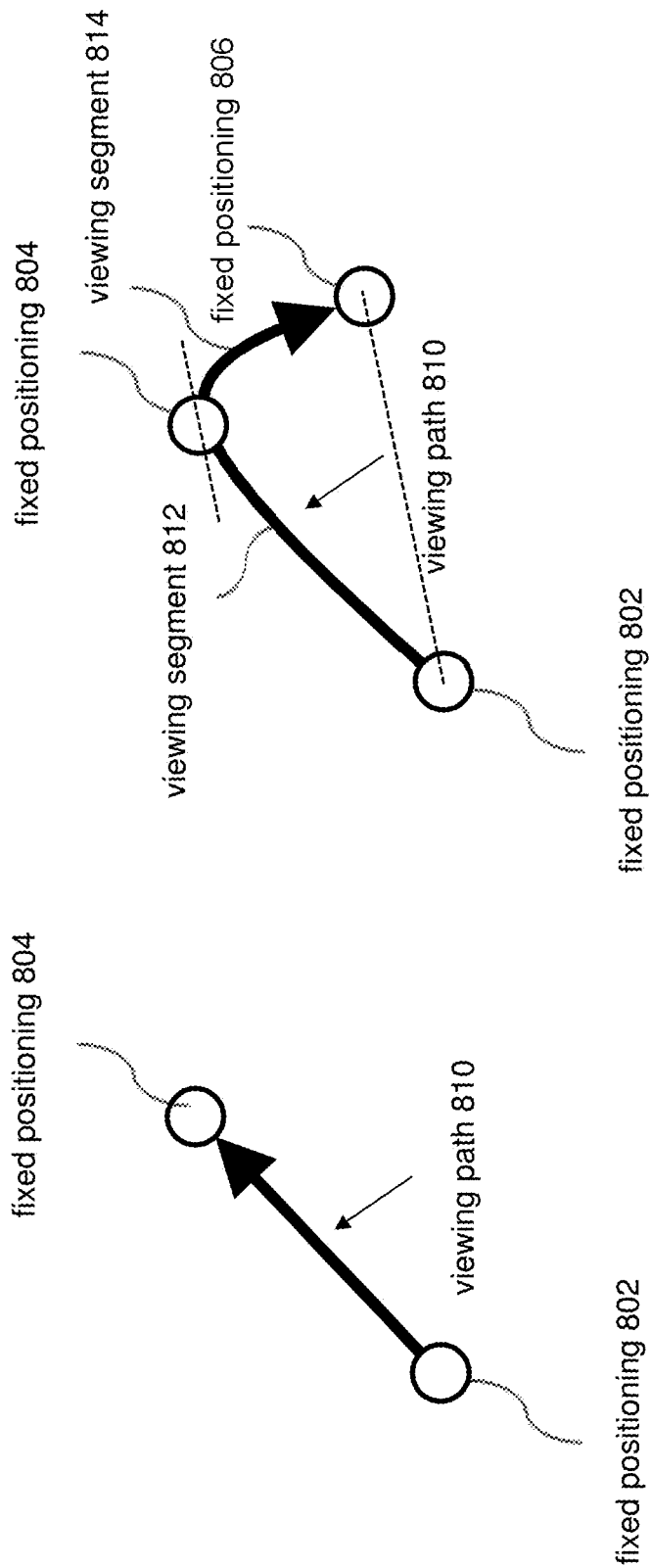
FIGS. 8A and 8B illustrate an example viewing path.

For example, FIGS. 8A and 8B illustrate an example viewing path 810. The viewing path 810 may have been determined based on fixed positionings 802, 804 of a viewing window. The fixed positioning 802, 804 may be adjacent to each other and different from each other. For example, the fixed positionings 802, 804 may corresponding to a viewing window being pointed in different viewing directions, and the viewing path 810 may be determined to include changes from the viewing direction of the fixed positioning 802 to the viewing direction of the fixed positioning 804. The viewing path 810 may be changed as shown in FIG. 8B. The viewing path 810 may be changed based on addition of a fixed positioning 806. The fixed positioning 806 may be adjacent to and different from the fixed positioning 804. For example, the fixed positioning 806 may correspond to the viewing window being pointed in another direction, and the viewing path 810 may be changed to include changes from the viewing direction of the positioning 804 to the viewing direction of the positioning 806.

The addition of the fixed positioning 806 may cause changes in the viewing path 810 between the fixed positioning 802 and the fixed positioning 804. Rather than using the shortest path between adjacent positioning, the viewing path 810 may be determined to include curves through fixed positioning 804. For instance, use of a spherical linear interpolation to determine a viewing path may result adjacent fixed positionings being connected by the shortest path in the arc. Such determination of the viewing path may result in sharp corners one or more fixed positionings. Instead, the viewing path 810 may be determined to include curves at one or more fixed positionings, such as by using CatMull-Rom interpolation. Usage of the CatMull-Rom for viewing path determination may include conversion of viewing direction defined in a Euler-angle domain/space to a quaternion domain/space.

In some implementations, determination of a viewing path to include curves at one or more fixed positionings may include setting the rate of changes in the positioning of the viewing window at a moment based on a preceding framing of the visual content and a subsequent framing of the visual content. For example, referring to FIG. 8B, the rate of changes in the positioning of the viewing window at the moment corresponding to the fixed positioning 804 may be determined based on the framing of the visual content at the moment corresponding to the fixed positioning 802 and the framing of the visual content at the moment corresponding to the fixed positioning 806. For example, the rate of changes in the viewing direction (slope of the viewing direction) of the viewing window at the moment corresponding to the fixed positioning 804 may be determined based on the slope between the viewing direction of the viewing window at the moment corresponding to the fixed positioning 802 and the viewing direction of the viewing window at the moment corresponding to the fixed positioning 806. Thus, changes in the positioning of the viewing window within the field of the view of the visual content at a moment between the preceding moment and the subsequent moment may be determined based on the framing of the visual content at the preceding moment and the framing of the visual content at the subsequent moment.

The presentation component 108 may be configured to generate one or more presentations of the video content based on the viewing path and/or other information. A presentation of the video content may include the extents of the visual content within the viewing window. In some implementations, the extents of the visual content within the viewing window may be used to generate a two-dimensional video a spherical video.

Generating a presentation may include displaying the presentation on one or more display. For example, the presentation component 108 may generate a view of the video that includes the extents of the visual content within the viewing window, with the viewing window changing (e.g., in viewing direction, in viewing size, in viewing rotation, in viewing projection) as a function of progress through the progress length of the visual content based on the viewing path.

Generating a presentation may include generating one or more files used to present the extents of the visual content within the viewing window on one or more display. The file(s) may be used to present the visual content within the viewing window at the time of the generation and/or at a later time. For example, generating a presentation may include generating encoded video content that includes the extents of the visual content within the viewing window and/or instructions for rendering the presentation using the viewing window within the visual content. For example, the presentation may be generated as an encoded version of a video clip, and the video clip may be opened in a video player for presentation. The presentation may be generated as instructions for presenting visual content, such as instructions defining the viewing window as a function of progress through the progress length (e.g., listing the viewing direction, the viewing size, the viewing rotation, and the viewing projection for time stamps within the video). A video player may use the instructions to retrieve the portions of the visual content identified in the instructions for presentation when the video/instructions are opened/to be presented.

Presentation information defining the presentation (e.g., encoded video clip, instructions) may be stored in one or more storage media. For example, the presentation information may be stored in the electronic storage 13, remote storage locations (storage media located at/accessible through a server), and/or other locations. In some implementations, the presentation information may be stored through one or more intermediary devices. For example, the processor 11 may be located within a computing device without a connection to the storage device (e.g., the computing device lacks WiFi/cellular connection to the storage device). The presentation information may be stored through another device that has the necessary connection (e.g., using a WiFi/cellular connection of a paired mobile device, such as a smartphone, tablet, laptop, to store information in one or more storage media). Other storage locations for and storage of the presentation information are contemplated.

While the present disclosure may be directed to video content, one or more other implementations of the system may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
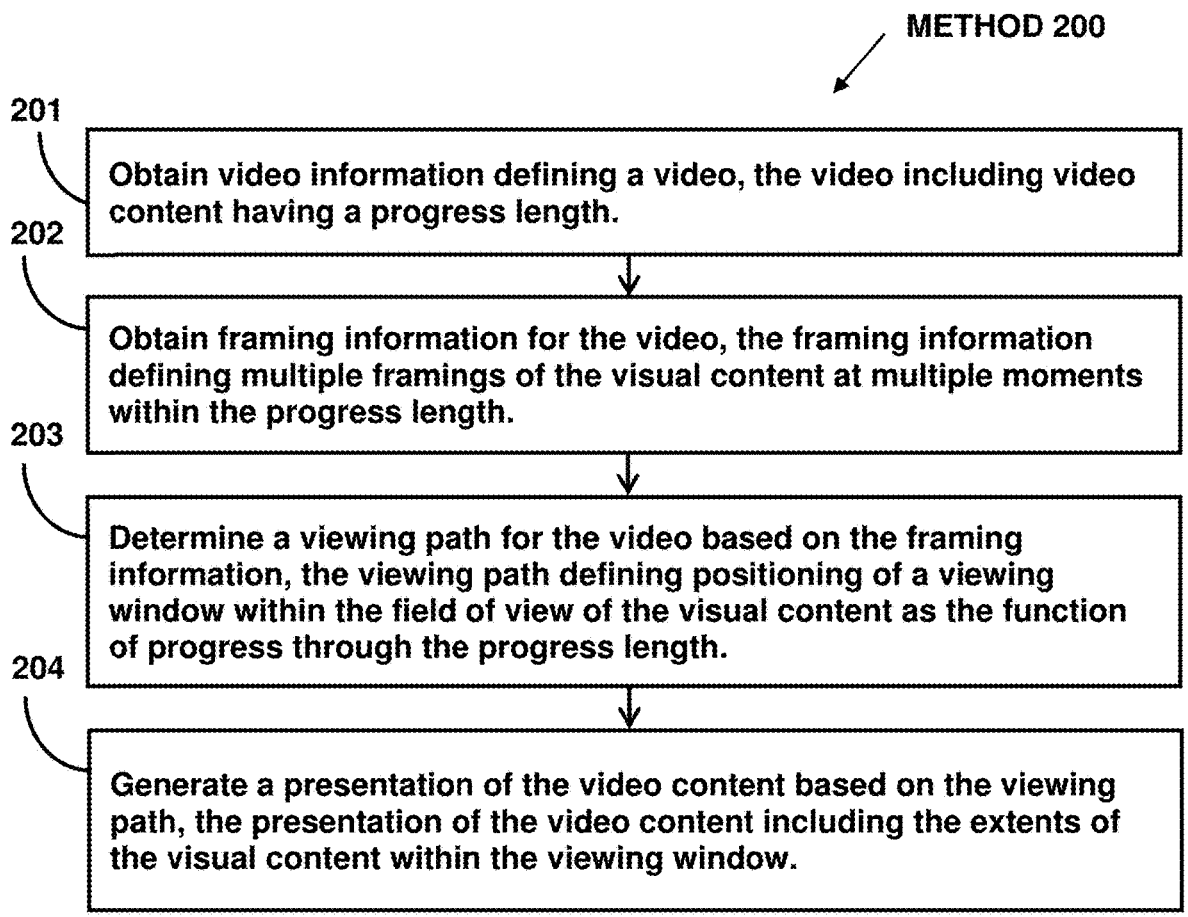
FIG. 2 illustrates a method for determining viewing paths through videos.

FIG. 2 illustrates method 200 for generating viewing paths through videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include video content having a progress length. The video content may include visual content viewable as a function of progress through the progress length. The visual content may have a field of view. In some implementations, operation 201 may be performed by a processor component the same as or similar to the video information component 102 (Shown in FIG. 1 and described herein).

At operation 202, framing information may be obtained. Framing information for the video may define multiple framings of the visual content at multiple moments within the progress length. An individual framing of the visual content may define a positioning of a viewing window within the field of view of the visual content at a corresponding moment within the progress length. The viewing window may define extents of the visual content to be included within a presentation of the video content. The multiple framings of the visual content may include a first framing of the visual content at a first moment within the progress length, a second framing of the visual content at a second moment within the progress length, and/or other framing of the visual content at other moments within the progress length. The second framing of the visual content may be different from the first framing of the visual content. In some implementations, operation 202 may be performed by a processor component the same as or similar to the framing information component 104 (Shown in FIG. 1 and described herein).

At operation 203, a viewing path for the video may be determined based on the framing information and/or other information. The viewing path may define the positioning of the viewing window within the field of view of the visual content as the function of progress through the progress length. The positioning of the viewing window may include a first positioning of the viewing window at the first moment based on the first framing of the visual content, a second positioning of the viewing window at the second moment based on the second framing of the visual content, and/or other positioning of the viewing window at other moments. In some implementations, operation 203 may be performed by a processor component the same as or similar to the viewing path component 106 (Shown in FIG. 1 and described herein).

At operation 204, the presentation of the video content may be generated based on the viewing path and/or other information. The presentation of the video content may include the extents of the visual content within the viewing window. In some implementations, operation 204 may be performed by a processor component the same as or similar to the presentation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for determining viewing paths through videos, the system comprising:
one or more physical processors configured by machine-readable instructions to:
obtain video information defining a video, the video including video content having a progress length, the video content including visual content viewable as a function of progress through the progress length, the visual content having a field of view, wherein the video is associated with framing information defining separate framings of the visual content at separate moments within the progress length, an individual framing of the visual content defining a positioning of a viewing window within the field of view of the visual content at a corresponding moment within the progress length;
determine a viewing path for the video based on the framing information, the viewing path defining the positioning of the viewing window within the field of view of the visual content as the function of progress through the progress length, the separate framings of the visual content at the separate moments within the progress length defining fixed positionings of the viewing window within the viewing path, wherein determination of the viewing path for the video based on the framing information includes determination of changes in the positioning of the viewing window between the fixed positionings of the viewing window within the viewing path; and
generate a presentation of the video content based on the viewing path, the presentation of the video content including extents of the visual content within the viewing window.

2. The system of claim 1, wherein the individual framing of the visual content defines the positioning of the viewing window within the field of view of the visual content based on a viewing direction and a viewing size.

3. The system of claim 2, wherein the individual framing of the visual content further defines the positioning of the viewing window within the field of view of the visual content based on a viewing rotation.

4. The system of claim 3, wherein the individual framing of the visual content further defines a viewing projection of the visual content within the viewing window.

5. The system of claim 1, wherein the viewing path is used as a director track for the video.

6. The system of claim 1, wherein metadata of the video includes the framing information for the video.

7. The system of claim 1, wherein generation of the presentation of the video content includes display of the presentation on a display.

8. The system of claim 1, wherein generation of the presentation of the video content includes generation of one or more files used to display the presentation on a display.

9. The system of claim 8, wherein the one or more files include instructions defining the viewing window as the function of progress through the progress length.

10. A method for determining viewing paths through videos, the method performed by a computing system including one or more processors, the method comprising:

obtaining, by the computing system, video information defining a video, the video including video content having a progress length, the video content including visual content viewable as a function of progress through the progress length, the visual content having a field of view, wherein the video is associated with framing information defining separate framings of the visual content at separate moments within the progress length, an individual framing of the visual content defining a positioning of a viewing window within the field of view of the visual content at a corresponding moment within the progress length;

determining, by the computing system, a viewing path for the video based on the framing information, the viewing path defining the positioning of the viewing window within the field of view of the visual content as the function of progress through the progress length, the separate framings of the visual content at the separate moments within the progress length defining fixed positionings of the viewing window within the viewing path, wherein determining the viewing path for the video based on the framing information includes determining changes in the positioning of the viewing window between the fixed positionings of the viewing window within the viewing path; and generating, by the computing system, a presentation of the video content based on the viewing path, the presentation of the video content including extents of the visual content within the viewing window.

11. The method of claim 10, wherein the individual framing of the visual content defines the positioning of the viewing window within the field of view of the visual content based on a viewing direction and a viewing size.

12. The method of claim 11, wherein the individual framing of the visual content further defines the positioning of the viewing window within the field of view of the visual content based on a viewing rotation.

13. The method of claim 12, wherein the individual framing of the visual content further defines a viewing projection of the visual content within the viewing window.

14. The method of claim 10, wherein the viewing path is used as a director track for the video.

15. The method of claim 10, wherein metadata of the video includes the framing information for the video.

16. The method of claim 10, wherein generating the presentation of the video content includes displaying the presentation on a display.

17. The method of claim 10, wherein generating the presentation of the video content includes generating one or more files used to display the presentation on a display.

18. The method of claim 17, wherein the one or more files include instructions defining the viewing window as the function of progress through the progress length.

19. A system for determining viewing paths through videos, the system comprising:

one or more physical processors configured by machine-readable instructions to:

obtain video information defining a video, the video including video content having a progress length, the video content including visual content viewable as a function of progress through the progress length, the visual content having a field of view, wherein metadata of the video includes framing information defining separate framings of the visual content at separate moments within the progress length, an individual framing of the visual content defining a positioning of a viewing window within the field of view of the visual content at a corresponding moment within the progress length, wherein the individual framing of the visual content defines the positioning of the viewing window within the field of view of the visual content based on a viewing direction and a viewing size;

determine a viewing path for the video based on the framing information, the viewing path defining the positioning of the viewing window within the field of view of the visual content as the function of progress through the progress length, the separate framings of the visual content at the separate moments within the progress length defining fixed positionings of the viewing window within the viewing path, wherein determination of the viewing path for the video based on the framing information includes determination of changes in the positioning of the viewing window between the fixed positionings of the viewing window within the viewing path, wherein the changes in the positioning of the viewing window between the fixed positionings of the viewing window within the viewing path is determined based on a type of interpolation; and generate a presentation of the video content based on the viewing path, the presentation of the video content including extents of the visual content within the viewing window.

20. The system of claim 19, wherein the viewing path is used as a director track for the video.

* * * * *